(12) United States Patent
Matteson et al.

(10) Patent No.: US 7,739,561 B2
(45) Date of Patent: Jun. 15, 2010

(54) METHOD AND APPARATUS FOR MONITORING AN OPTICAL NETWORK SIGNAL

(75) Inventors: Patricia R. Matteson, San Antonio, TX (US); Jorey M. Pascasio, Jr., San Antonio, TX (US); Renne G. Pascasio, legal representative, San Antonio, TX (US)

(73) Assignee: AT&T Intellectual Property 1, L.P., Reno, NV (US)

( * ) Notice: Subject to any disclaimer, the term of this patent is extended or adjusted under 35 U.S.C. 154(b) by 841 days.

(21) Appl. No.: 11/487,523

(22) Filed: Jul. 14, 2006

(65) Prior Publication Data

US 2008/0052583 A1 Feb. 28, 2008

(51) Int. Cl.
*G01R 31/28* (2006.01)
(52) U.S. Cl. .................... 714/715; 356/73.1
(58) Field of Classification Search ................ 356/3.1, 356/73.1; 359/124; 385/24; 398/16; 714/734, 714/712, 717, 715
See application file for complete search history.

(56) References Cited

U.S. PATENT DOCUMENTS

| | | | | |
|---|---|---|---|---|
| 6,141,089 A | * | 10/2000 | Thoma et al. | 356/73.1 |
| 6,583,867 B1 | | 6/2007 | Jennings et al. | |
| 7,310,135 B2 | * | 12/2007 | Wisseman | 356/73.1 |
| 2002/0015200 A1 | * | 2/2002 | Jennings et al. | 359/124 |
| 2002/0101577 A1 | | 8/2002 | Thwing et al. | |
| 2003/0035615 A1 | * | 2/2003 | Foltzer | 385/24 |
| 2003/0174962 A1 | | 9/2003 | Poole et al. | |
| 2006/0198634 A1 | * | 9/2006 | Ofalt et al. | 398/16 |
| 2007/0115456 A1 | | 5/2007 | Wisseman | |
| 2007/0154212 A1 | * | 7/2007 | Ruchet et al. | 398/9 |

OTHER PUBLICATIONS

U.S. Appl. No. 11/286,806, Philip H. Wiseman, A System & Method for Monitoring an Optical Fiber, filed Nov. 23, 2005, Office Action Nov. 28, 2006.
U.S. Appl. No. 11/286,806, Philip H. Wiseman, A System & Method for Monitoring an Optical Fiber, filed Nov. 23, 2005, Response to Office Action Feb. 28, 2007.

(Continued)

*Primary Examiner*—David Ton
(74) *Attorney, Agent, or Firm*—G. Michael Roebuck (57) ABSTRACT

A method is disclosed for monitoring a communication link between a first apparatus and a second apparatus, the method comprising receiving concurrently from the first apparatus (e.g., a central office) at the second apparatus (e.g., an optical demarcation point at a customer premises) a communication signal at a communication wavelength, $\lambda_1$ and a test signal at a test wavelength $\lambda_t$, permanently separating the test signal from the communication signal at the second apparatus and sending to the first apparatus on a return path between the first apparatus and the second apparatus a signal indicating whether the test signal was received at the second apparatus. An apparatus is disclosed including an interface for receiving concurrently the communication signal and the test signal, a filter for permanently separating the test signal from the communication signal and a coupler for permanently placing a signal on a return path.

34 Claims, 4 Drawing Sheets

OTHER PUBLICATIONS

U.S. Appl. No. 11/286,806, Philip H. Wiseman, A System & Method for Monitoring an Optical Fiber, filed Nov. 23, 2005, Final Office Action May 31, 2007.
U.S. Appl. No. 11/286,806, Philip H. Wiseman, A System & Method for Monitoring an Optical Fiber, filed Nov. 23, 2005, Response to Final OA Jul. 20, 2007.
U.S. Appl. No. 11/286,806, Philip H. Wiseman, A System & Method for Monitoring an Optical Fiber, filed Nov. 23, 2005, Notice of Allowance Oct. 15, 2007.
U.S. Appl. No. 11/286,806, Philip H. Wiseman, A System & Method for Monitoring an Optical Fiber, filed Nov. 23, 2005, Issue Fee Paid Nov. 1, 2007.

* cited by examiner

METHOD AND APPARATUS FOR MONITORING AN OPTICAL NETWORK SIGNAL

FIELD OF THE DISCLOSURE

The present disclosure relates to monitoring an optical signal on a communication link.

BACKGROUND

Dense Wavelength Division Multiplexing (DWDM) is a technology that transmits multiple data signals using different wavelengths of light through a single optical fiber. Incoming optical signals are assigned to specific frequencies within a designated frequency band. The capacity of the optical fiber is increased when these signals are multiplexed out onto the fiber.

DWDM is protocol and bit rate independent so data signals using varying protocols such as asynchronous transfer mode (ATM), SONET, and internet protocol (IP) can be transmitted through the same data stream over a single optical fiber pair regardless of their speed and protocol differences. Each individual protocol remains intact during the transmission process because there is not an optic-electric-optic conversion during transmission with DWDM transmission. The fact that the signals are not terminated within the optical layer allows the independence of the bit-rates and protocols, thus allowing DWDM technology to be easily integrated with the existing equipment in the network.

Each incoming optical signal is assigned to a specific wavelength division multiplexer (WDM) optical wavelength ($\lambda$—lambda) laser. The $\lambda$ is a unique color of light as identified in DWDM standards. The $\lambda$ (along with other lambdas) passes through an optical multiplexer which allows the multiple lambdas (or wavelengths) to be transmitted over the same pair of fibers. At the other end, the customer end, the multiplexed signals are each filtered to a separate wavelength. The appropriate optical interface card is then used to reproduce the original client signal in an appropriate protocol from each wavelength.

DETAILED DESCRIPTION

In an illustrative embodiment, a method for monitoring a communication link between a first apparatus and a second apparatus is disclosed, the method including modulating at the first apparatus a client signal to generate a communication signal at a communication wavelength, $\lambda_1$; modulating at the first apparatus, the client signal to generate a test signal at a test wavelength, $\lambda_t$; sending the test signal and the communication signal concurrently on an optical fiber from the first apparatus to the second apparatus for permanently separating the test signal from the communication signal at the second apparatus; and receiving at the first apparatus on a return path of the communication link from the second apparatus a signal indicating whether the test signal was received at the second apparatus.

In another particular embodiment the test signal is separated passively from the communication signal at the second apparatus and returned to the first apparatus. In another particular embodiment of the method the first apparatus is a central office and the second apparatus is a terminating apparatus associated with an optical demarcation point at the customer premises. In another particular embodiment of the method the signal indicating whether the test signal was received is the test signal passively returned on the return path. In another particular embodiment the signal indicating whether the test signal was received selected from the group consisting of an output returned on the return path from an optical detector in communication with the test signal and the test signal copied and returned on the return path.

In another particular embodiment of the method the first apparatus sends the test signal over a first optical fiber, sends the communication wavelength signal over a second optical fiber and receives the test signal over the second optical fiber from the second apparatus. In another particular embodiment of the method the method further includes determining at the first apparatus, from the test signal returned from the second apparatus, a parameter selected from the group consisting of network performance and delay. In another particular embodiment of the method the client signal includes but is not limited to a protocol selected from the group consisting of synchronous optical network (SONET), asynchronous transfer mode (ATM) and internet protocol (IP). An illustrative embodiment can be used with any protocol signal transmitted over an optical network.

In another particular embodiment a method for monitoring a communication link between a first apparatus and a second apparatus is disclosed, the method including receiving concurrently from the first apparatus at the second apparatus a communication signal at a communication wavelength, $\lambda_1$ and a test signal at a test wavelength $\lambda_t$; permanently separating the test signal from the communication signal at the second apparatus; and sending to the first apparatus on a return path between the first apparatus and the second apparatus, a signal indicating whether the test signal was received at the second apparatus. In another particular embodiment of the method the test signal is separated passively from the communication signal at the second apparatus passively coupled onto the return path and returned to the first apparatus.

In another particular embodiment of the method the first apparatus is a central office and the second apparatus is a terminating apparatus comprising a filter and a regenerator associated with an optical demarcation point at the customer premises. In another particular embodiment of the method the signal indicating whether the test signal was received further comprises the test signal passively coupled onto the return path and returned on the return path from the second apparatus to the first apparatus. In another particular embodiment of the method the signal indicating whether the test signal was received is selected from the group consisting the test signal copied and returned on the return path and an output from an optical detector in data communication with the test signal.

In another particular embodiment of the method the second location receives the test signal over a first optical fiber, receives the communication signal over a second optical fiber and sends the test signal over the second optical fiber. In another particular embodiment of the method, the method further includes returning the test signal to the first apparatus, for determining a parameter selected from the group consisting of network performance and delay. In another particular embodiment of the method the communication signal comprises a protocol selected from the group consisting of synchronous optical network (SONET), asynchronous transfer mode (ATM) and internet protocol (IP).

In another particular embodiment, a computer readable medium is disclosed containing a computer program for execution by a processor to perform a method for monitoring a communication link between a first apparatus and a second apparatus, the computer program including instructions to modulate at the first apparatus a client signal to generate a communication signal at a communication wavelength, $\lambda_1$; instructions to modulate at the first apparatus, the client signal to generate a test signal at a test wavelength, $\lambda_t$; instructions to send the test signal and the communication signal concurrently on an optical fiber from the first apparatus to the second apparatus for permanently separating the test signal from the communication signal at the second apparatus; and instructions to receive at the first apparatus a signal indicating whether the test signal was received at the second apparatus on the return path device.

In another particular embodiment, a computer readable medium is disclosed containing a computer program for execution by a processor to perform a method for monitoring a communication link between a first apparatus and a second apparatus, the computer program including instructions to receive concurrently from the first apparatus at the second apparatus a communication signal at a communication wavelength, $\lambda_1$ and a test signal at a test wavelength $\lambda_t$; instructions to permanently separate the test signal from the communication signal at the second apparatus; and instructions to send on the return path from the second apparatus to the first apparatus a signal indicating whether the test signal was received at the second apparatus.

In another particular embodiment, an apparatus is disclosed for monitoring a communication link between a first apparatus and a second apparatus, the apparatus including a modulator at the first apparatus to generate a communication signal at a communication wavelength, $\lambda_1$ from a client signal and to generate a test signal at a test wavelength $\lambda_t$ from the client signal; an interface for sending the test signal and the communication signal concurrently on an optical fiber from the first apparatus to the second apparatus for permanently separating the test signal from the communication signal at the second apparatus; and an interface for permanently receiving at the first apparatus on the return path a signal indicating whether the test signal was received at the second apparatus.

In another particular embodiment of the apparatus, the test signal is separated passively from the communication signal at the second apparatus and returned to the first apparatus. In another particular embodiment of the apparatus, the first apparatus is a central office and the second apparatus is a terminating apparatus associated with an optical demarcation point at the customer premises. In another particular embodiment of the apparatus, the signal indicating whether the test signal was received includes the test signal passively returned on the return path. In another particular embodiment of the apparatus, the signal indicating whether the test signal is present further comprises the test signal copied at the second apparatus and returned from the second apparatus on the return path.

In another particular embodiment of the apparatus the apparatus further includes a processor coupled to a memory; and a computer program in the memory comprising instructions to concurrently send the test signal over a first optical fiber, instructions to send the communication wavelength signal over a second optical fiber and instructions to receive the passively coupled test wavelength signal over the second optical fiber from the second apparatus. In another particular embodiment of the apparatus, the computer program further includes instructions to determine at the first apparatus, from the test signal, a parameter selected from the group consisting of network performance and delay.

In another particular embodiment of the apparatus, the client signal includes a protocol selected from the group consisting of synchronous optical network (SONET), asynchronous transfer mode (ATM) and internet protocol (IP). In another particular embodiment an apparatus is disclosed for monitoring a communication link between a first apparatus and a second apparatus, the apparatus including an interface for receiving concurrently from the first apparatus at the second apparatus a communication signal at a communication wavelength, $\lambda_1$ and a test signal at a test wavelength, $\lambda_t$; a filter for permanently separating the test signal from the communication signal at the second apparatus; and a coupler in data communication with the filter and a return path between the first apparatus and the second apparatus for permanently placing on the return path from the second apparatus to the first apparatus a signal indicating whether the test signal was received at the second apparatus.

In another particular embodiment of the apparatus the filter is a passive filter. In another particular embodiment of the apparatus, the first apparatus is a central office and the second apparatus is a terminating apparatus associated with an optical demarcation point at the customer premises. In another particular embodiment of the apparatus, the signal indicating whether the test signal was received includes the test signal passively coupled onto the return path. In another particular embodiment of the apparatus, the signal indicating whether the test signal was received includes the test signal regenerated and returned on the return path. In another particular embodiment of the apparatus, the second apparatus receives the test signal over a first optical fiber, receives the communication wavelength signal over a second optical fiber and sends the test signal over the second optical fiber.

In another particular embodiment of the apparatus, the apparatus further includes a passive coupler at the second device in data communication with the filter and the return path for passively returning the test signal to the first apparatus, for determining at the first apparatus, a parameter selected from the group consisting of network performance and delay. In another particular embodiment of the apparatus, the communication signal includes a protocol selected from the group consisting of synchronous optical network (SONET), asynchronous transfer mode (ATM) and internet protocol (IP).

For detailed understanding of the illustrative embodiment, references should be made to the following detailed description of an illustrative embodiment, taken in conjunction with the accompanying drawings, in which like elements have been given like numerals. Methods and systems to monitor optical fibers and optical fiber networks are disclosed in an illustrative embodiment. These methods and systems are used to carry an optical monitoring signal between a first location, such as a managed location, e.g., a central office and a second location such as a remote location, e.g., a customer site or the demarcation between service provider equipment and a customer's equipment and then back to first (managed) location.

In view of the above, an illustrative embodiment is presented through one or more of its various aspects to provide one or more advantages, such as those noted below.

When a network service provider (SP) does not place network intelligent terminating equipment at the customer premises, the SP terminates the DWDM or WDM signal onto an optical demarcation point. The optical demarcation point provides the customer a connection to customer's equipment (CPE—Customer Premises Equipment). This implies that there would not be an intelligent device to monitor the signal at the customer premises (from the SP's perspective) because there is typically no intelligent network monitoring equipment located at the CPE location. In the absence of intelligent network monitoring equipment, visibility of the network and assessment of its operation state is limited to the network monitoring elements located in the Central Office (CO).

In an illustrative embodiment, to monitor a signal at the customer premises and to provide feedback regarding the overall health of the network for this situation, the provider uses the terminating apparatus described in an illustrative embodiment below. The CO transmits a communication signal at a first wavelength $\lambda_1$ (communication wavelength) and a test signal (the same or a copy of the communication signal) at a second (test wavelength) wavelength $\lambda_t$. The test signal is the communication signal shifted or modulated from communication the wavelength $\lambda_1$ to a different test wavelength, $\lambda_t$. CO sends the communication wavelength and the test wavelength signals to the terminating apparatus.

In an illustrative embodiment, the terminating apparatus includes but is not limited to two components. The first component is a device such as a filter. In a particular embodiment the filter is a passive filter that does not require electrical power. The filter is wavelength selective such as a band pass filter that filters out the test signal wavelength from the communication wavelength signal. The second component of the terminating apparatus is a passive coupler (requires no power) or a passive regenerator that returns the test signal to the CO over a return path. The test signal is returned substantially unaltered by the filter, coupler or regenerator. In another particular embodiment, the regenerator acts as a passive transceiver and receives the signal from the CO, and returns the test signal from an optical demarcation point at the customer premises to the CO over the return path. A second component passively filters out the test signal and returns it through the same separate pair of fiber optic cables back to the CO. In an illustrative embodiment, the terminating apparatus and associated method are permanently present at or near an optical demarcation point at the customer premises, so there is no need for the CO to switch or control the terminating apparatus to the filter and return the test signal from the terminating apparatus and associated method. In an illustrative embodiment, the CO permanently (continuously) sends the test and communication signal concurrently to the terminating apparatus and associated method, and the terminating apparatus and associated method permanently receive the concurrently sent signals and return the test signal to the CO. The term permanently and continuously is used herein to mean that the functionality is always present and not switched off and on.

The test signal "copy" being at a different frequency $\lambda_t$ than the communication signal $\lambda_1$, does not interfere with the communication signal and thus does not have to be transmitted over a separate optical fiber (relative to the original communication signal). Thus the communication signal and the test signal are transmitted concurrently to the terminating apparatus at the optical demarcation point at the customer premises and received concurrently at the terminating apparatus at the optical demarcation point at the customer premises. Even if the original signal were provisioned over a diverse (physical separation) pair of fiber, a fiber cut on the signal path of the communication signal will result in loss of the communication signal at the terminating apparatus. Without a test signal from the CO, the terminating will be unable to provide feedback (other than "no signal present on the fiber") to the CO. The absence of a return signal $\lambda_t$ on the return path at the CO from the optical demarcation point at the customer premises is indicative of a "no signal present on the fiber" condition. Hence, the "copy" of the wavelength shifted test signal can be provisioned or sent back to the CO over the same fiber sheath on which it was received. The message "no signal present on the fiber" to the CO is one of the possible results of the use of the terminating apparatus.

If there is no fiber cut and signal transmission is perceived to be "normal", the "copy" of the original signal (the wavelength shifted test signal) is returned to the CO and the SP will be able to monitor the "health" or performance of the communication link from the CO all the way to the terminating apparatus at the customer premises. The "copy" or test signal return to the CO provides an indicator that the signal did reach the customer premises. In another particular embodiment, the "copy" test signal is terminated on a second DWDM platform, the provider will be able to de-multiplex the "copy" test signal and restore the individual client signals. Once the client signals have been restored from the return test signal, the provider can then perform testing on the restored client signal to gather network performance statistics.

In an illustrative embodiment the terminating apparatus and associated method provide feedback indicating that either no signal (e.g., fiber cut or equipment failure) was received or the signal was received at the terminating apparatus (the demarcation point at customer premises). If there is no signal received at the terminating apparatus provides a signal indicating whether the test signal is present at the terminating apparatus, which assists in identifying where (in the network) the problem lies. A different wavelength shift can be added to a copy test signal at each stage of the communication network to identify where in the network a problem occurs. A dispatch to the customer premises would only be needed to solve an identified network problem indicated when there is a test signal present at the terminating apparatus. A dispatch to the customer premises would not be needed if the problem is beyond the demarcation point, that is, within the CPE.

In an illustrative embodiment, in restoring the original client signals, filtered and returned from the terminating apparatus at the optical demarcation point at the customer premises, network management information can be derived such as Network Availability (for all optical protocols) and Performance Data (e.g., Packet Delivery Rate for IP and Ethernet). The SP may decide to forego detailed network management information and choose to terminate the signal on an optical detector. The optical detector only provides a presence or absence of the signal on the return path to the CO from the terminating apparatus and/or the associated method.

In an illustrative embodiment, the terminating apparatus and associated method can be applied to any optical signal (e.g., SONET, Fiber Channel, Optical Ethernet, or any other signal transported over a DWDM or WDM network) since the terminating apparatus and associated method return the test signal without altering any of the test signal's characteristics. In a particular illustrative embodiment, the terminating apparatus and associated method can be used as a terminating device (located at the customer premises) for any optical application. In a particular embodiment, the terminating apparatus provides the capability of providing feedback on the client signal without deploying expensive network equipment at the CPE. In a particular embodiment the terminating apparatus is passive, not requiring electrical power to filter and return the test signal to the CO.

Deployment of optical services in previous optical fiber network systems has utilized conversion and analysis equipment (e.g., conversion of an optical signal to an electrical signal and conversion back to optical signal) placed at a customer site, which may be associated with a CPE. This prior conversion and analysis equipment, while located at the remote location (e.g., CPE), was managed (switched off and on, etc.) from a managed location, e.g., the CO and often provided the ability to detect faults with the fiber network and differentiate these fiber faults from faults or disconnects at the customer equipment. However, it is advantageous from a cost and resource perspective to initially provide optical services without placing conversion and analysis equipment at the customer site. This practice of not placing conversion and analysis equipment may serve to reduce cost and provide customers, vendors and suppliers with reduced space and power restrictions.

A direct optical interface to an optical demarcation point at the customer premises, without the associated monitoring equipment, substantially eliminates the ability of a service provider to differentiate between service provider fiber network systems faults and other alarm or fault conditions that are caused or located within the customer environment. Inability to determine where faults occur may result in increased costs for personnel servicing dispatches and expending troubleshooting time. A switched optical conversion and analysis device including optical switches at customer sites is costly and requires significant equipment expense at the customer site. A switching signal must also be applied to activate the optical switch to engage and activate the switched optical equipment. In contrast, aspects of several embodiments of the methods and systems disclosed herein provide for monitoring the signal carrying fiber to a remote location and for differentiating between SP infrastructure fiber faults and customer equipment faults without requiring any power or a switching signal at the remote site directed to fiber optic network system fault monitoring.

A particular illustrative embodiment provides for monitoring of optical fibers to and from a remote location and differentiation between faults at the service provider infrastructure fiber and faults at the customer equipment. A particular illustrative embodiment does not require any switching at the remote customer site as the test signal is permanently, that is, always or continuously returned to the CO when present at the terminating apparatus. In another particular embodiment, power is not required at the terminating apparatus to return the test signal, as the test signal is passively filtered and coupled onto the return path by the terminating apparatus and associated method. An aspect of several particular embodiments of methods and systems disclosed is the use of a test wavelength(s), $\lambda_t$ that is different from communication wavelength(s), $\lambda_1$. The test wavelength signal is passively filtered and returned to the CO from the remote location at or near the network demarcation between the CPE and the SP fiber network. This passive filtering and returning enables network monitoring functions to be performed from one managed end or node on the SP's network link (e.g., at a CO). The passive return of the test signal ($\lambda_t$) can be accomplished by filtering the test signal ($\lambda_t$) from the received signal and returning the test signal ($\lambda_t$) to the CO. The passive filter and return path coupling is always present (permanent) on the demarcation point so that it is not necessary to provide a switching signal.

In a particular embodiment the passive filter and coupler do not require power to filter and return the test signal $\lambda_t$ to the CO. In another particular embodiment the test signal is copied without alteration and returned to the CO. In another particular embodiment the test signal is copied by terminating apparatus and associated method and amplified and then returned to the CO.

Non-limiting embodiments of systems and methods present transport optical monitoring services at a lower cost than placing intelligent analysis equipment at a remote customer site. These embodiments provide passive monitoring that substantially reduces increases in operational expenses when compared to an unmonitored fiber connection. Passive monitoring significantly lowers costs or resources compared to switched other optical analysis and test devices residing at a remote location (e.g., an optical demarcation point at the customer premises). In addition, by enabling a manageable direct optical interface to the customer site, the illustrative embodiment also supports shared multiplexing of various services thus reducing the transport costs between central offices.

Figure 1:
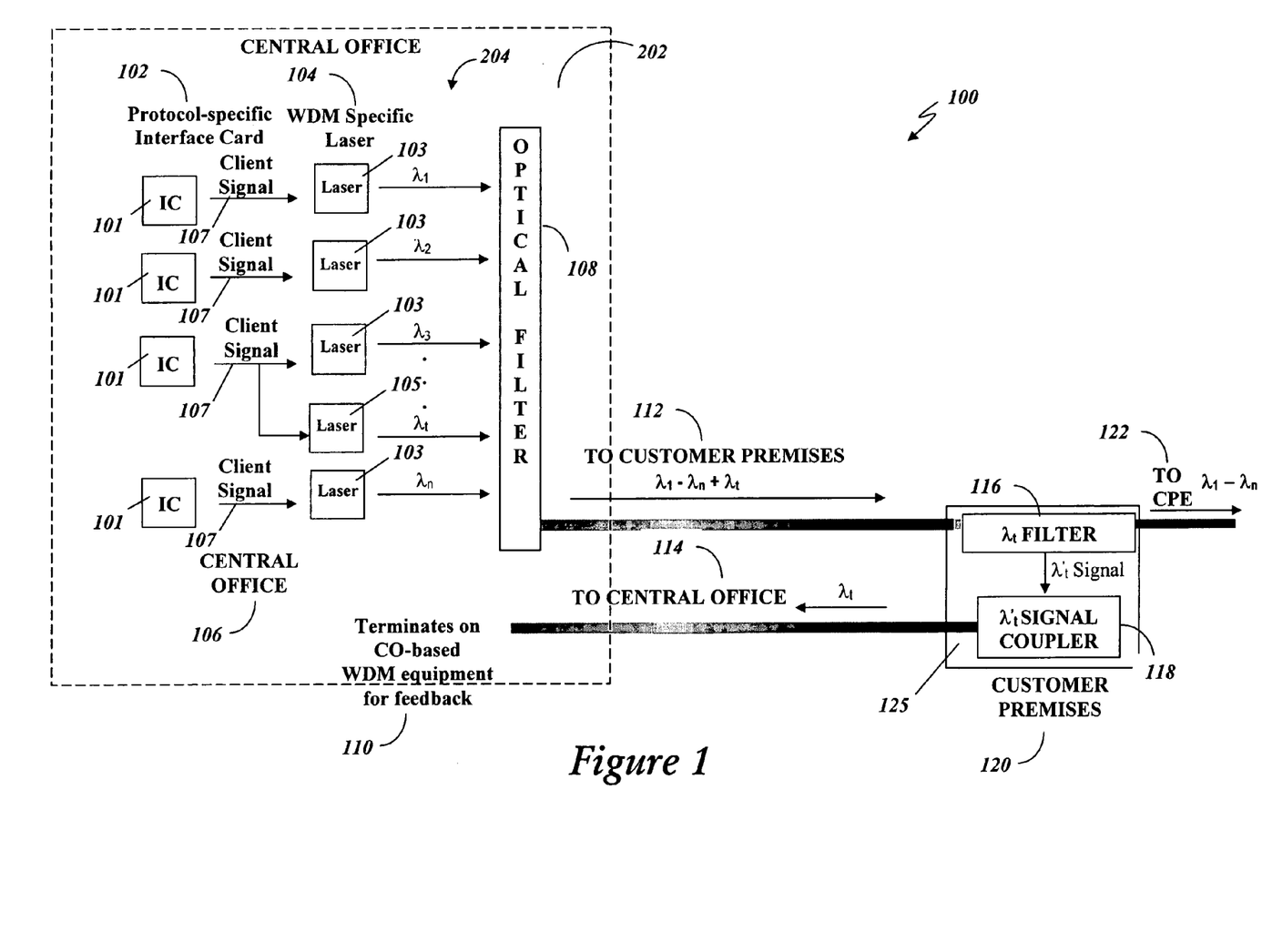
FIG. 1 depicts an illustrative embodiment of a fiber optic network configuration that includes an optical demarcation point at a customer premises networked to Central Offices (CO)

Turning now to FIG. 1, a CO 202 includes but is not limited to a WDM 204 including a bank of protocol specific interface cards 101. Each protocol specific interface card 101 produces a client signal 107 in a particular protocol. Each client signal is modulated by a laser 103 to a specific communication wavelength $\lambda_1$-$\lambda_n$. In addition one or more client signals 107 are copied and modulated to a test wavelength $\lambda_{t1}$ by laser 107.

Each test wavelength $\lambda_{t1}$-$_{tm}$ is distinct from each communication wavelength $\lambda_1$-$\lambda_m$. The signals at wavelength $\lambda_1$-$\lambda_n$ plus $\lambda_{t1}$-$\lambda_{tm}$ are filtered through optical filter 108 and transmitted over optical fiber 112 to the terminating apparatus 125 at an optical demarcation point at the customer premises 120. The passive filter 116 receives the signals at wavelengths $\lambda_1$-$\lambda_n$ and $\lambda_{t1}$-$\lambda_{tm}$. The termination apparatus and associated method allows the $\lambda_1$-$\lambda_n$ signals to the pass through to CPE. The test signals $\lambda_{t1}$-$\lambda_{tm}$ are filtered out and coupled on to return path 112 by passive signal coupler 118 which returns the $\lambda_{t1}$-$\lambda_{tm}$ to the CO over fiber 112 or fiber 114 ("the return path").

While aspects of the illustrative embodiments disclosed utilize two optical fibers 112 and 114, one for carrying the monitoring wavelength to the remote location and a second optical fiber for carrying the test wavelength back to the CO, it will be appreciated that one fiber 112 may be used to carry the test wavelength signal and communication wavelength signal in both directions. Numerous variations on the configurations of these embodiments are possible, and the optimum design depends on the desired functionality and the cost and performance of the available components.

In a particular embodiment, the test $\lambda_{t1}$-$\lambda_{tm}$ wavelengths maybe different than all current and anticipated or unanticipated potential future communication wavelengths. The optical fiber may carry more than one communication wavelength. In several illustrative embodiments, communication wavelength ranges are 770-860 mn (for multi-mode fiber), 1260-1360 nm, and 1430-1580 nm. DWDM wavelengths may extend from 1270 nm to 1610 nm, or higher, in 20 nm steps. The selection of monitor wavelengths may depend on the desired transmission characteristics (modulation, receive sensitivity, etc.), fiber specifications, and the cost and performance of available lasers and optical filters. For various embodiments, communication wavelengths include the L-band (e.g., 1610 nm or 1625 nm) or reserving a DWDM wavelength for monitoring.

Figure 2:
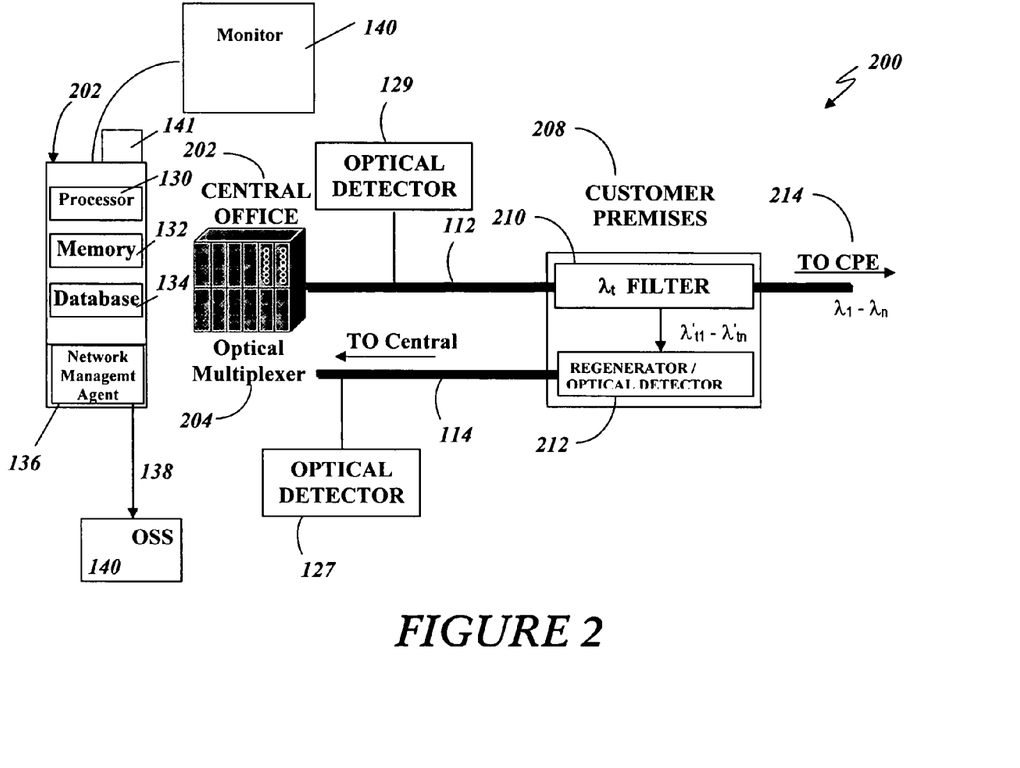
FIG. 2 depicts a configuration of an illustrative embodiment provided for monitoring fiber optic networks between a CO and a remote location.

Turning now to FIG. 2, processing is provided in the CO by processing unit 202. Processing unit 202 includes processor 130 and memory 132. Memory 132 is coupled to processor 130. A database 134 is embedded in memory 132 and is accessible to processor 130. In a particular embodiment, the memory 132 can include a computer program that is embedded therein that can include logic instructions to perform one or more of the method steps described herein. This processing may be associated with processor unit 130. Additional processing may include comparing the current value with either a baseline value or threshold value determined at system installation. A network management agent 136 is provided to measure network performance and send outputs to monitor 140 via interface 141.

As illustrated in FIG. 2, a monitor output 138 may include an alarm output. In a non-limiting embodiment, an alarm message or alarm output may be sent to an Operational Support System (OSS) 202 either directly or via associated transport equipment. The alarm output may be a voltage to trigger an alarm relay or an analog or digital representation of the fiber attenuation. The alarm output may be used to reduce delays in responding to fiber fault problems. In another aspect of a particular embodiment of monitoring and/or alarm messaging provides for autonomous messaging to a Network Management Agent 136 when fiber monitoring is integrated with transport equipment. Alarms may occur on loss of signal or when a threshold value is attained, and these features are provisionable in particular embodiments. The transmitted test signals $\lambda_{t1}$-$\lambda_{tn}$ can be compared to the returned test signals $\lambda_{t1}'$-$\lambda_{tn}'$ threshold values can be set for any network parameters including but not limited to network availability for all optical protocols and performance data (e.g., packet delivery rate for IP and Ethernet protocols).

In a particular embodiment monitor taps (i.e., 10% optical taps) and photo-detectors may be added to monitor the transmit power 127 and receive power 129 of the test wavelengths $\lambda_{t1}$-$\lambda_{tn}$ to allow detection of faults between the CO equipment and the transport equipment or an optical demarcation point at the customer premises. For example, several aspects of particular embodiments provide detection and alarm signaling of network conditions in the transmit direction (e.g., detection of laser or jumper faults). In another aspect of a particular embodiment a method is presented for providing troubleshooting alarms on transport equipment receivers when monitoring shows that outside plant fiber is operational (e.g., customer equipment or CO jumper). These additional photo-detectors combined with the communication channel 112 between filters allow for further determinations of whether faults are occurring on the customer side of the optical demarcation point at the customer premises or in a service provider's fiber optic network infrastructure.

In another embodiment a system is presented wherein the provided monitoring operations may be optional. Options include continuous monitoring, sampled monitoring, or on-demand testing. Optical input and output ports can also be included in various embodiments to support the use of external test equipment (i.e., data protocol analyzer or Optical Time Domain Reflectometer) for testing the round-trip path at the monitor wavelength.

In another aspect of a particular embodiment a method is presented for retrieving optical energy loss data, or delivering system conditions to the output monitor 140 by communicating with the managed location using telnet or any other communications protocol in a communication port 141.

Figure 3:
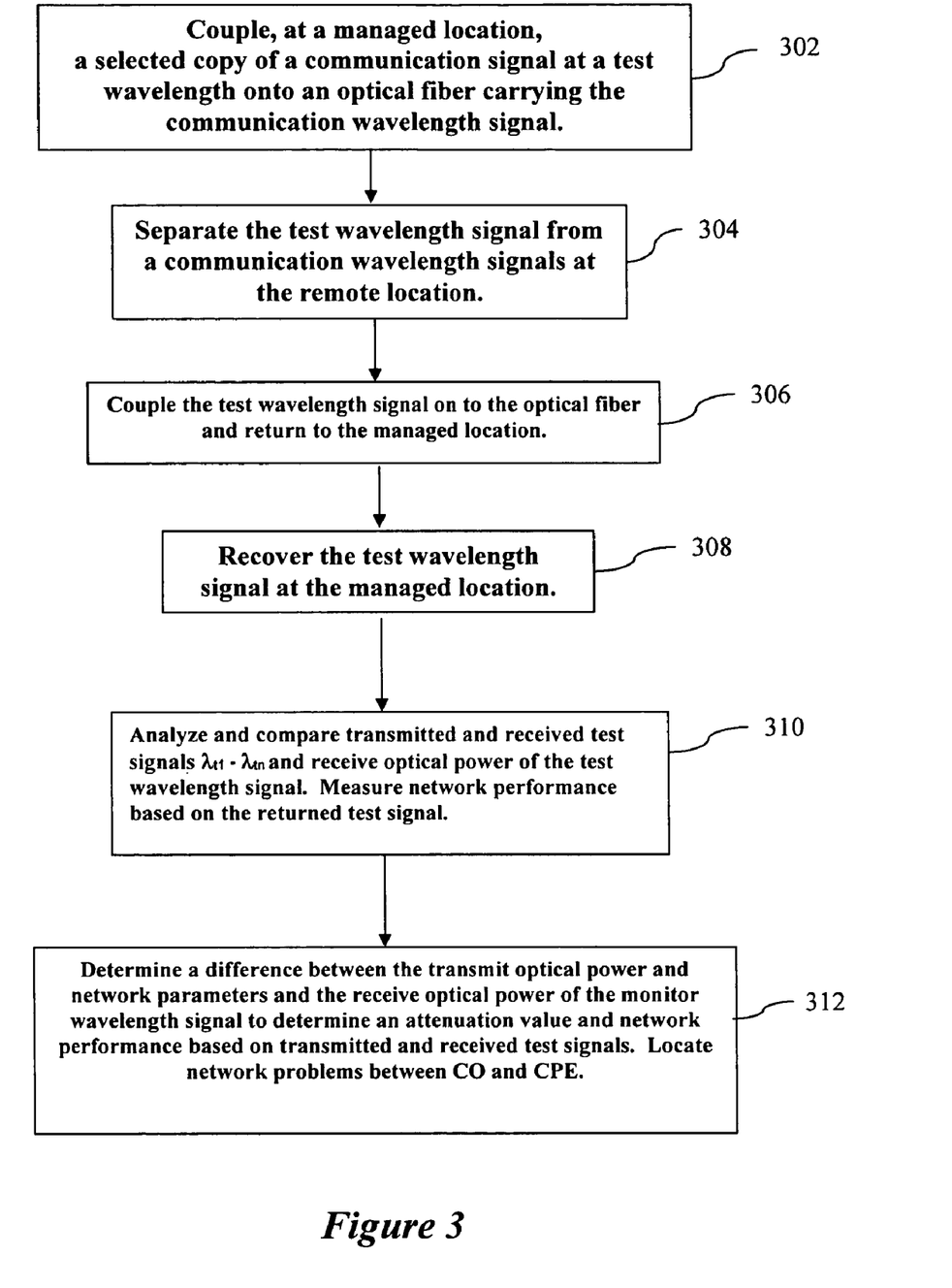
FIG. 3 is a flow chart depicting an illustrative embodiment providing for monitoring a fiber optic network between a managed location and a remote location.

Turning now to FIG. 3, FIG. 3 is a flow chart of functions performed in an illustrative embodiment in monitoring a fiber optic or communication link or network between a managed location and a remote location. In an illustrative embodiment, at the managed location, e.g. the CO, a selected copy of a communication signal is coupled at a test wavelength onto an optical fiber carrying the communication wavelength signal to the remote location at 302. The communication and test wavelength signals are sent concurrently from the CO to the remote device (e.g., the optical demarcation point at the customer premises) and received concurrently at the remote location. The test wavelength signals $\lambda_{t1}$-$\lambda_{tn}$ are received concurrently with the communication wave length signals and separated from the communication wavelength signals $\lambda_1$-$\lambda_n$ at the remote location, e.g., the terminating apparatus at or near the optical demarcation point at the customer premises at 304. The test wavelength signals are coupled onto the optical fiber return path by the terminating apparatus and associated method at the remote device and returned to the managed location (e.g., (CO) at 306.

The test wavelength signal is recovered at the managed location (e.g., CO) at 308. The CO measures and compares transmitted and received test signals $\lambda_{t1}'$-$\lambda_{tn}'$ and receives optical power of the test wavelength signal and measures network performance at 310. The CO processor or the software function network management agent residing in the processor compares the transmitted test signal to the returned test signal to determine a difference between the transmit optical power and network parameters and the received optical power and other characteristics of the test wavelength signals to determine an attenuation value and network performance based on a comparison of the transmitted and received test signals at 312. The CO processor or network management agent also locates network problems between CO and the optical demarcation point at the customer premises based on the comparison and analysis of the sent communication signal and the returned test signal.

Figure 4:
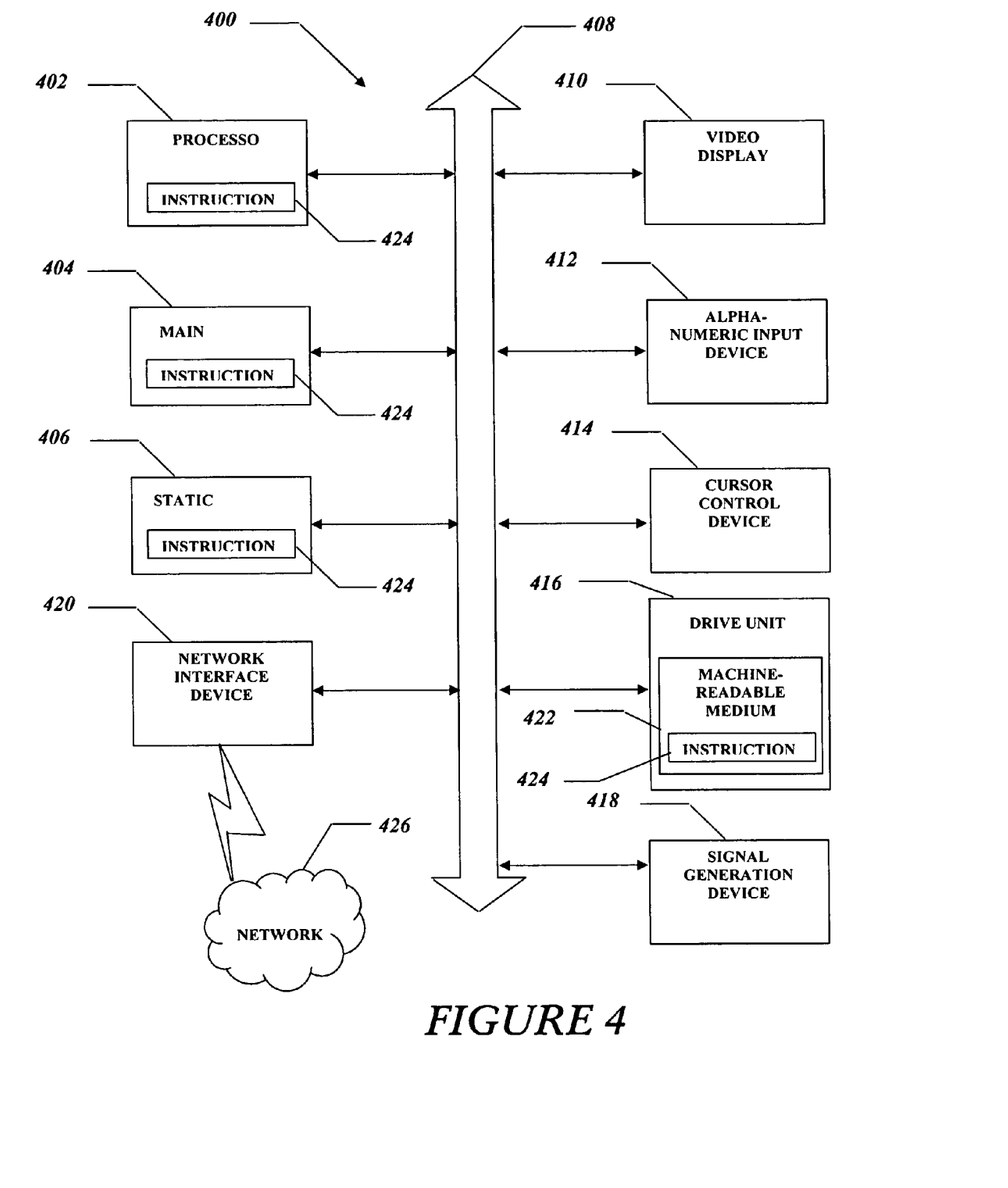
FIG. 4 is a diagrammatic representation of a machine in the form of a computer system within which a set of instructions, when executed, may cause the machine to perform any one or more of the methodologies of the illustrative embodiment.

Turning now to FIG. 4, FIG. 4 is a diagrammatic representation of a machine in the form of a computer system 400 within which a set of instructions, when executed, may cause the machine to perform any one or more of the methodologies discussed herein. In some embodiments, the machine operates as a standalone device. In some embodiments, the machine may be connected (e.g., using a network) to other machines. In a networked deployment, the machine may operate in the capacity of a server or a client user machine in server-client user network environment, or as a peer machine in a peer-to-peer (or distributed) network environment. The machine may comprise a server computer, a client user computer, a personal computer (PC), a tablet PC, a set-top box (STB), a Personal Digital Assistant (PDA), a cellular telephone, a mobile device, a palmtop computer, a laptop computer, a desktop computer, a personal digital assistant, a communications device, a wireless telephone, a land-line telephone, a control system, a camera, a scanner, a facsimile machine, a printer, a pager, a personal trusted device, a web appliance, a network router, switch or bridge, or any machine capable of executing a set of instructions (sequential or otherwise) that specify actions to be taken by that machine. It will be understood that a device of the illustrative includes broadly any electronic device that provides voice, video or data communication. Further, while a single machine is illustrated, the term "machine" shall also be taken to include any collection of machines that individually or jointly execute a set (or multiple sets) of instructions to perform any one or more of the methodologies discussed herein.

The computer system 400 may include a processor 402 (e.g., a central processing unit (CPU), a graphics processing unit (GPU), or both), a main memory 404 and a static memory 406, which communicate with each other via a bus 408. The computer system 400 may further include a video display unit 410 (e.g., a liquid crystal display (LCD), a flat panel, a solid state display, or a cathode ray tube (CRT)). The computer system 400 may include an input device 412 (e.g., a keyboard), a cursor control device 414 (e.g., a mouse), a disk drive unit 416, a signal generation device 418 (e.g., a speaker or remote control) and a network interface device 420.

The disk drive unit 416 may include a machine-readable medium 422 on which is stored one or more sets of instructions (e.g., software 424) embodying any one or more of the methodologies or functions described herein, including those methods illustrated in herein above. The instructions 424 may also reside, completely or at least partially, within the main memory 404, the static memory 406, and/or within the processor 402 during execution thereof by the computer system 400. The main memory 404 and the processor 402 also may constitute machine-readable media. Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the illustrative embodiment, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

The illustrative embodiment contemplates a machine readable medium containing instructions 424, or that which receives and executes instructions 424 from a propagated signal so that a device connected to a network environment 426 can send or receive voice, video or data, and to communicate over the network 426 using the instructions 424. The instructions 424 may further be transmitted or received over a network 426 via the network interface device 420.

While the machine-readable medium 422 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the illustrative embodiment. The term "machine-readable medium" shall accordingly be taken to include, but not be limited to: solid-state memories such as a memory card or other package that houses one or more read-only (non-volatile) memories, random access memories, or other re-writable (volatile) memories; magneto-optical or optical medium such as a disk or tape; and carrier wave signals such as a signal embodying computer instructions in a transmission medium; and/or a digital file attachment to e-mail or other self-contained information archive or set of archives is considered a distribution medium equivalent to a tangible storage medium. Accordingly, the illustrative embodiment is considered to include any one or more of a machine-readable medium or a distribution medium, as listed herein and including art-recognized equivalents and successor media, in which the software implementations herein are stored.

Although the present specification describes components and functions implemented in the embodiments with reference to particular standards and protocols, the illustrative embodiment is not limited to such standards and protocols. Each of the standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same functions are considered equivalents.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are merely representational and may not be drawn to scale. Certain proportions thereof may be exaggerated, while others may be minimized. Accordingly, the specification and drawings are to be regarded in an illustrative rather than a restrictive sense.

Such embodiments of the inventive subject matter may be referred to herein, individually and/or collectively, by the term "illustrative embodiment" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

Although the illustrative embodiment has been described with reference to several illustrative embodiments, it is understood that the words that have been used are words of description and illustration, rather than words of limitation. Changes may be made within the purview of the appended claims, as presently stated and as amended, without departing from the scope and spirit of the illustrative embodiment in its aspects.

Although the illustrative embodiment has been described with reference to particular means, materials and embodiments, the invention is not intended to be limited to the particulars disclosed; rather, the invention extends to all functionally equivalent structures, methods, and uses such as are within the scope of the appended claims.

In accordance with various embodiments of the present illustrative embodiment, the methods described herein are intended for operation as software programs running on a computer processor. Dedicated hardware implementations including, but not limited to, application specific integrated circuits, programmable logic arrays and other hardware devices can likewise be constructed to implement the methods described herein. Furthermore, alternative software implementations including, but not limited to, distributed processing or component/object distributed processing, parallel processing, or virtual machine processing can also be constructed to implement the methods described herein.

The invention claimed is:

1. A method for monitoring a communication link between a first apparatus and a second apparatus, the method comprising:
modulating at the first apparatus a client signal to generate a communication signal at a communication wavelength, $\lambda_1$;
modulating at the first apparatus, the client signal to generate a test signal at a test wavelength, $\lambda_t$;
passively coupling without using electrical power, the test signal and the communication signal onto an optical fiber;
sending the test signal and the communication signal concurrently on the optical fiber from the first apparatus to the second apparatus for passively separating without using electrical power, the test signal from the communication signal at the second apparatus; and
receiving at the first apparatus on a return path of the communication link between the first apparatus and the second apparatus from the second apparatus a signal indicating whether the test signal was received at the second apparatus.

2. The method of claim 1, wherein the test signal is separated passively without using electrical power, from the communication signal at the second apparatus and returned to the first apparatus.

3. The method of claim 1, wherein the first apparatus is a central office and the second apparatus is a terminating apparatus associated with an optical demarcation point at customer premises.

4. The method of claim 1, wherein the signal indicating whether the test signal was received further comprises the test signal passively returned on the return path.

5. The method of claim 1, wherein the signal indicating whether the test signal was received from the group consisting of an output returned on the return path from an optical detector in communication with the test signal and the test signal copied and returned on the return path.

6. The method of claim 1, wherein the first location sends the test signal over a first optical fiber, sends the communication wavelength signal over a second optical fiber and receives the test signal over the second optical fiber from the second apparatus.

7. The method of claim 1, further comprising:
determining at the first apparatus, from the test signal returned from the second apparatus, a parameter selected from the group consisting of network performance and delay.

8. The method of claim 1, wherein the client signal comprises a protocol selected from the group consisting of synchronous optical network (SONET), asynchronous transfer mode (ATM) and internet protocol (IP).

9. A method for monitoring a communication link between a first apparatus and a second apparatus, the method comprising:
receiving concurrently from the first apparatus at the second apparatus a communication signal at a communication wavelength, $\lambda_1$ and a test signal at a test wavelength $\lambda_t$;
passively separating without using electrical power, the test signal from the communication signal at the second apparatus; and
sending to the first apparatus on a return path between the first apparatus and the second apparatus, a signal indicating whether the test signal was received at the second apparatus.

10. The method of claim 9, wherein the test signal is separated passively without using electrical power, from the communication signal at the second apparatus passively coupled onto the return path and returned to the first apparatus.

11. The method of claim 9, wherein the first apparatus is a central office and the second apparatus is a terminating apparatus comprising a passive filter without using electrical power and a regenerator associated with an optical demarcation point at the customer premises.

12. The method of claim 9, wherein the signal indicating whether the test signal was received further comprises the test signal passively coupled without using electrical power onto the return path and returned on the return path from the second apparatus to the first apparatus.

13. The method of claim 9, wherein the signal indicating whether the test signal was received is selected from the group consisting of the test signal copied and returned on the return path and an output from an optical detector in data communication with the test signal.

14. The method of claim 9, wherein the second location receives the test signal over a first optical fiber, receives the communication wavelength signal over a second optical fiber and sends the test signal over the second optical fiber.

15. The method of claim 9, further comprising:
returning the test signal to the first apparatus, for determining a parameter selected from the group consisting of network performance and delay.

16. The method of claim 9, wherein the communication signal comprises a protocol selected from the group consisting of synchronous optical network (SONET), asynchronous transfer mode (ATM) and internet protocol (IP).

17. A computer readable medium containing a computer program for execution by a processor to perform a method for monitoring a communication link between a first apparatus and a second apparatus, the computer program comprising:
instructions to modulate at the first apparatus a client signal to generate a communication signal at a communication wavelength, $\lambda_1$;
instructions to modulate at the first apparatus, the client signal to generate a test signal at a test wavelength, $\lambda_t$;
instructions to send the test signal and the communication signal concurrently on an optical fiber from the first apparatus to the second apparatus for passively separating without using electrical power, the test signal from the communication signal at the second apparatus; and
instructions to receive at the first apparatus a signal indicating whether the test signal was received at the second apparatus on the return path device.

18. A computer readable medium containing a computer program for execution by a processor to perform a method for monitoring a communication link between a first apparatus and a second apparatus, the computer program comprising:
- instructions to receive concurrently from the first apparatus at the second apparatus a communication signal at a communication wavelength, $\lambda_1$ and a test signal at a test wavelength $\lambda_t$;
- instructions to passively separate without using electrical power the test signal from the communication signal at the second apparatus; and
- instructions to send on the return path from the second apparatus to the first apparatus a signal indicating whether the test signal was received at the second apparatus.

19. An apparatus for monitoring a communication link between a first apparatus and a second apparatus, the apparatus comprising:
- a modulator at the first apparatus to generate a communication signal at a communication wavelength, $\lambda_1$ from a client signal and a test signal at a test wavelength $\lambda_t$ from the client signal;
- an interface for sending the test signal and the communication signal concurrently on an optical fiber from the first apparatus to the second apparatus for passively separating without using electrical power, the test signal from the communication signal at the second apparatus; and
- an interface for permanently receiving at the first apparatus on the return path a signal indicating whether the test signal was received at the second apparatus.

20. The apparatus of claim 19, wherein the test signal is separated passively without using electrical power from the communication signal at the second apparatus and returned to the first apparatus.

21. The apparatus of claim 19, wherein the first apparatus is a central office and the second apparatus is a terminating apparatus associated with an optical demarcation point at a customer premises.

22. The apparatus of claim 19, wherein the signal indicating whether the test signal was received further comprises the test signal passively returned on the return path.

23. The apparatus of claim 19, wherein the signal indicating whether the test signal is present further comprises the test signal copied at the second apparatus and returned from the second apparatus on the return path.

24. The apparatus of claim 19, further comprising:
- a processor coupled to a memory; and
- a computer program in the memory comprising instructions to concurrently send the test signal over a first optical fiber, instructions to send the communication wavelength signal over a second optical fiber and instructions to receive the passively coupled without using electrical power test wavelength signal over the second optical fiber from the second apparatus.

25. The apparatus of claim 19, the computer program further comprising instructions to determine at the first apparatus, from the test signal, a parameter selected from the group consisting of network performance and delay.

26. The apparatus of claim 19, wherein the client signal comprises a protocol selected from the group consisting of synchronous optical network (SONET), asynchronous transfer mode (ATM) and internet protocol (IP).

27. An apparatus for monitoring a communication link between a first apparatus and a second apparatus, the apparatus comprising:
- an interface for receiving concurrently from the first apparatus at the second apparatus a communication signal at a communication wavelength, $\lambda_1$ and a test signal at a test wavelength, $\lambda_t$;
- a filter for passively separating without using electrical power, the test signal from the communication signal at the second apparatus; and
- a coupler in data communication with the filter and a return path between the first apparatus and the second apparatus for passively without using electrical power placing on the return path from the second apparatus to the first apparatus a signal indicating whether the test signal was received at the second apparatus.

28. The apparatus of claim 27, wherein the filter is a passive filter without electrical power.

29. The apparatus of claim 27, wherein the first apparatus is a central office and the second apparatus is a terminating apparatus associated with an optical demarcation point at a customer premises.

30. The apparatus of claim 27, wherein the signal indicating whether the test signal was received further comprises the test signal passively coupled onto the return path.

31. The apparatus of claim 27, wherein the signal indicating whether the test signal was received further comprises the test signal regenerated arid returned on the return path.

32. The apparatus of claim 27, wherein the second apparatus receives the test signal over a first optical fiber, receives the communication wavelength signal over a second optical fiber and sends the test signal over the second optical fiber.

33. The apparatus of claim 27, further comprising:
- a passive coupler without electrical power at the second device in data communication with the test signal and the return path for passively returning the test signal to the first apparatus, for determining at the first apparatus, a parameter selected from the group consisting of network performance and delay.

34. The apparatus of claim 27, wherein the communication signal comprises a protocol selected from the group consisting of synchronous optical network (SONET), asynchronous transfer mode (ATM) and internet protocol (IP).

* * * * *